US006999253B1

(12) United States Patent
Niwa et al.

(10) Patent No.: US 6,999,253 B1
(45) Date of Patent: Feb. 14, 2006

(54) COLOR WHEEL ASSEMBLY WITH COLOR WHEEL ATTACHED DIRECTLY TO DRIVING MOTOR

(75) Inventors: Shinichi Niwa, Iwata-gun (JP); Toshiaki Asakawa, Iwata-gun (JP); Shigeyuki Adachi, Iwata-gun (JP); Kuniyuki Takao, Iwata-gun (JP)

(73) Assignee: Minebea Co., Ltd., Kitasaku (JP)

( * ) Notice: Subject to any disclaimer, the term of this patent is extended or adjusted under 35 U.S.C. 154(b) by 0 days.

(21) Appl. No.: 10/981,689

(22) Filed: Nov. 5, 2004

(30) Foreign Application Priority Data

Sep. 2, 2004 (JP) ............................ 2004-255864

(51) Int. Cl.
*G02B 5/22* (2006.01)
*G02B 7/00* (2006.01)

(52) U.S. Cl. ...................... 359/892; 359/891; 359/885; 348/743; 356/418; 353/84; 362/293

(58) Field of Classification Search ................ 359/891, 359/892, 885; 348/743; 356/418; 353/84; 362/293
See application file for complete search history.

(56) References Cited

U.S. PATENT DOCUMENTS 4,800,474 A 1/1989 Bornhorst
5,257,332 A * 10/1993 Pimpinella .................. 385/59
5,868,482 A 2/1999 Edlinger et al.
6,011,662 A * 1/2000 Evans ........................ 359/891
6,024,453 A 2/2000 Edlinger et al.
6,574,046 B1 6/2003 Shioya
6,702,446 B2 3/2004 De Vaan et al.
6,715,887 B2 4/2004 Chang
6,813,087 B2 11/2004 Davis
6,867,934 B2 * 3/2005 Chen et al. ................. 359/892
6,896,376 B2 * 5/2005 Chin et al. .................... 353/84
2002/0005914 A1 1/2002 Tew
2002/0105729 A1 8/2002 Richards et al.
2003/0142241 A1 7/2003 Allen et al.
2004/0095767 A1 * 5/2004 Ohmae et al. .............. 362/293
2005/0018145 A1 1/2005 Kwon et al.
2005/0128614 A1 * 6/2005 Kao et al. ................... 359/892
2005/0168709 A1 * 8/2005 Wu ............................. 353/84
2005/0168857 A1 * 8/2005 Lee et al. .................. 359/892

FOREIGN PATENT DOCUMENTS

JP A 3-122903 5/1991
JP A 5-90391 4/1993
JP A 6-347639 12/1994
JP A 10-48542 2/1998
JP A 11-115711 4/1999
JP A 11-222664 8/1999
JP A 2000-239830 9/2000
JP A 2001-73136 3/2001
JP A 2003-50309 2/2003
JP A 2003-57424 2/2003
JP A 2004-101827 4/2004
JP 2003-057424 * 2/2005
JP 2004-101827 * 4/2005
WO WO 94/25796 11/1994

* cited by examiner

*Primary Examiner*—Leonidas Boutsikaris
(74) *Attorney, Agent, or Firm*—Oliff & Berridge, PLC

(57) ABSTRACT

A color wheel assembly includes a color wheel and a driving motor. The color wheel is attached directly to a hub of the driving motor. Consequently, no additional components are required to fix the color wheel to the driving motor, thereby reducing the number of components and the number of manufacturing processes. Thus, the color wheel assembly as a time-share light dispersing device can be inexpensively manufactured with a high degree of precision.

13 Claims, 4 Drawing Sheets

15
10A
26
18
16A
12A

COLOR WHEEL ASSEMBLY WITH COLOR WHEEL ATTACHED DIRECTLY TO DRIVING MOTOR

BACKGROUND OF THE INVENTION

1. Field of the Invention

The present invention relates to a color wheel assembly as a time-share light dispersing device, incorporating a color wheel suitable for use as a filter element.

2. Description of the Related Art

Color composition in a projection-type image display apparatus has conventionally been accomplished commonly by a method, such as: a single-panel method, in which one light valve element adapted to control light amount per pixel thereby creating an image is used to disperse each pixel into R (red), G (green), and B (blue) lights; and a three-panel method, in which three light valve elements dedicated to R, G and B lights, respectively, are used to produce R, G and B images in parallel, and then the three images thus produced are composed. Recently, as a light valve element capable of fast switching, such as a ferroelectric liquid crystal display element or a digital micro-mirror device, is increasingly coming into practical use, a time-sharing single-panel method is widely used. In the time-sharing single-panel method, R, G and B lights are caused to sequentially impinge on one light valve element, the light valve element is driven in synchronization with switching-over of the R, G and B lights thereby producing R, G and B images in a time-series manner, and the images thus produced are projected onto a screen, or the like. Here, color composition of the images is accomplished by a viewer due to an afterimage effect occurring at a sense of vision. In the time-sharing single-panel method, reduction in both dimension and weight of the apparatus, which is a feature of a single-panel method, can be achieved by employing a relatively simple optical system, and therefore the time-sharing single-panel method is favorable for realizing inexpensive fabrication of a projection-type image display apparatus. In such an image display apparatus, a color wheel is preferably used as a filter element of a time-share light dispersing device to sequentially disperse light emitted from a white light source into R, G and B lights having respective wavelength bands in a time-sharing manner.

FIGS. 4A and 4B are respectively top plan and side views of a conventional and typical color wheel assembly 200 as a time-share light dispersing device including such a color wheel. Referring to FIG. 4B, the color wheel assembly 200 comprises a color wheel 100, and a driving motor 106 including a motor hub 105. The color wheel 150 is a tricolor color wheel composed of a disk-like substrate 101 which is made of a light-transmitting material, for example, optical glass, and three pie-shaped (sectorial) filters 102, 103 and 104 which are formed on a surface of the substrate 101, and which transmit exclusively, for example, R, G and B lights, respectively. The color wheel 100 thus structured is fixedly attached to the motor hub 105 coaxially therewith. The color wheel assembly 200 operates such that the color wheel 100 is spun by the driving motor 106 so that white light S impinges sequentially on the filters (R, G and B) 102, 103 and 104 whereby the white light S is sequentially dispersed into R, G and B lights.

FIGS. 5 and 6 show respectively top plan and exploded side sectional view of a segment-type color wheel 160 comprising a plurality (four in FIG. 5) of sectorial color filter segments (hereinafter referred to as segments as appropriate) 112, 114, 116 and 118 which are separately prepared and are fixed in position by means of a support member 120 and a clamp member 122 so as to form a disk.

Specifically, as shown in FIG. 6, respective inner circumferences 112*a*, 114*a*, 116*a* and 118*a* of the segments 112, 114, 116 and 118 are fitted to an outer circumference of a smaller cylinder portion 120*a* of the support member 120 whereby the segments 112, 114, 116 and 118 are duly set in position in the radial direction of the color wheel 160, and respective surfaces of the segments 112, 114, 116 and 118 toward the inner circumferences 112*a*, 114*a*, 116*a* and 118*a* are fitted to an annular seat portion 120*b* of the support member 120 whereby the segments 112, 114, 116 and 118 are duly set in position in the thickness direction of the color wheel 160. Then, a smaller cylinder portion 122*a* of the clamp member 122 is engagingly inserted into a hollow 120*c* of the support member 120 so that an annular seat portion 122*b* of the clamp member 122 and the aforementioned annular seat portion 120*b* of the support member 120 sandwich and clamp the inner circumferential portions of the 112, 114, 116 and 118. And, when the support member 120 and the clamp member 122 are bonded or screwed together, the segments 112, 114, 116 and 118 are fixed in position. The color wheel 160 thus structured is fixedly attached to a hub (such as the hub 105 as shown in FIGS. 4A and 4B) of a motor (such as the driving motor 106 as shown FIG. 4B) such that the hub is inserted in a hollow 122*c* of the clamp member 122 (refer to, for example, Japanese Patent Applications Laid-Open Nos. 2004-101827 ([0010], and FIG. 6 therein) and H10-48542 (claim 1, and FIG. 2 therein).

As described above, the color wheel 160 is attached to the motor hub via the support member 120 and the clamp member 122 thus resulting in increased numbers of components and manufacturing processes, which inevitably involves increased production cost. The clamp member 122 functions to join a color wheel and a motor hub, and is a necessary component not only for a segment-type color wheel but also for a monolithic-type color wheel in which color filters are formed on a monolithic substrate therefore not requiring the support member 120.

SUMMARY OF THE INVENTION

The present invention has been made in light of the circumstances described above, and it is an object of the present invention to inexpensively provide a high-precision color wheel assembly as a time-share light dispersing device.

In order to achieve the object, according to one aspect of the present invention, a color wheel assembly comprises: a driving motor including a hub; and a color wheel which includes a plurality of filters which either selectively transmit or selectively reflect lights having respective wavelengths different from one another, and which is attached directly to the hub of the driving motor. With the construction described above, the structure and the manufacturing processes for fixing the color wheel to the hub can be simplified.

In the one aspect of the present invention, the color wheel may comprise a plurality of sectorial color filter segments arranged so as to form a disk. Consequently, in a color wheel assembly incorporating a segment-type color wheel, the structure and the manufacturing processes for fixing the color wheel to the hub can be simplified.

In the one aspect of the present invention, the hub may have protrusions, and the sectorial color filter segments may each have at least one through-hole or cavity for receiving each of the protrusions. Since the protrusions of the hub are engaged with the through-holes or cavities of the sectorial color filter segment thereby fixedly positioning the sectorial color filter segments with respect to the hub in the radial direction of the color wheel, the sectorial color filter segments can be surely prevented from getting scattered off from the hub due to centrifugal force when the color wheel spins at high speed. And no additional independent components are used for fixing the sectorial color filter segments to the hub.

In the one aspect of the present invention, the protrusions may be each constituted by a pin or ball that is press-fitted into each of through-holes or cavities formed at the hub, or that is loose-fitted therein to be adhesively fixed. Since the pins or the balls constituting the protrusions of the hub are engaged with the through-holes or cavities of the sectorial color filter segment thereby fixedly positioning the sectorial color filter segments with respect to the hub in the radial direction of the color wheel, the sectorial color filter segments can be surely prevented from getting scattered off from the hub due to centrifugal force when the color wheel spins at high speed.

In the one aspect of the present invention, the protrusions may be engagingly inserted through the through-holes of the sectorial color filter segments, and through the through-holes or the cavities of the hub when the color wheel is placed on the hub such that the through-holes of the sectorial color filter segments coincide with the through-holes or the cavities of the hub. Consequently, since the sectorial color filter segments are fixedly positioned with respect to the hub in the radial direction of the color wheel, the sectorial color filter segments can be surely prevented from getting scattered off from the hub due to centrifugal force when the color wheel spins at high speed.

In the one aspect of the present invention, the hub may be formed by casting, molding or pressing so as to integrally include the protrusions. Consequently, the number of components and the number of manufacturing processes can be reduced.

In the one aspect of the present invention, the cavities formed at the hub may be constituted by an annular groove or arc grooves. Consequently, since the color wheel can turn with respect to the hub after they are attached to each other, adhesive applied therebetween can be preferably spread for enhanced bonding strength.

In the one aspect of the present invention, the protrusions may be press-fitted into the through-holes or the cavities of the sectorial color filter segments, or loose-fitted therein to be adhesively fixed.

And, in the one aspect of the present invention, the hub constituting the driving motor may be assembled to the rest of components of the motor after the color wheel is attached to the hub. Consequently, since forces that are applied to the hub when the color wheel is attached to the hub are not applied to bearings which hold rotatably the hub with respect to the other portion of the motor, problems related to defective bearings can be suppressed.

Thus, a high-precision color wheel assembly as a time-share light dispersing device can be inexpensively provided.

BRIEF DESCRIPTION OF THE DRAWINGS

The above object and other advantages of the present invention will become more apparent by describing in detail the preferred embodiments of the present invention with reference to the attached drawings in which.

DETAILED DESCRIPTION OF THE PREFERRED EMBODIMENTS

Preferred embodiments of the present invention will hereinafter be described with reference to the accompanying drawings.

Figure 1A:
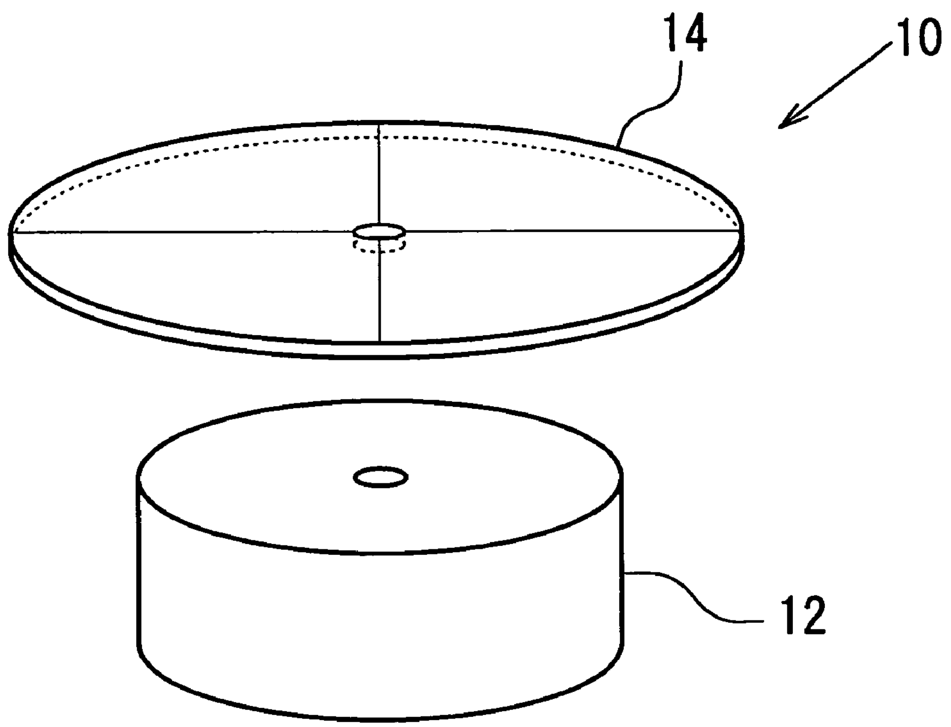
FIGS. 1A and 1B are respectively exploded perspective and assembled perspective views of a color wheel assembly according to a first embodiment of the present invention.
Figure 1B:
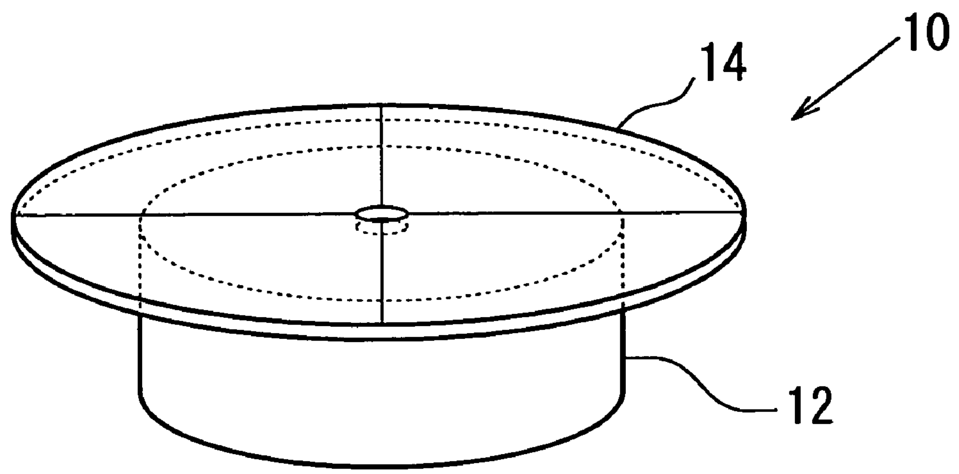

Referring to FIGS. 1A and 1B, a color wheel assembly 10 according to a first embodiment of the present invention comprises a motor hub 12 constituting a driving motor, and a monolithic-type color wheel 14 attached directly to the motor hub 12 without using any additional components as shown in FIG. 1B. In the present embodiment, the color wheel 14 is adhesively fixed to the motor hub 12.

Figure 2:
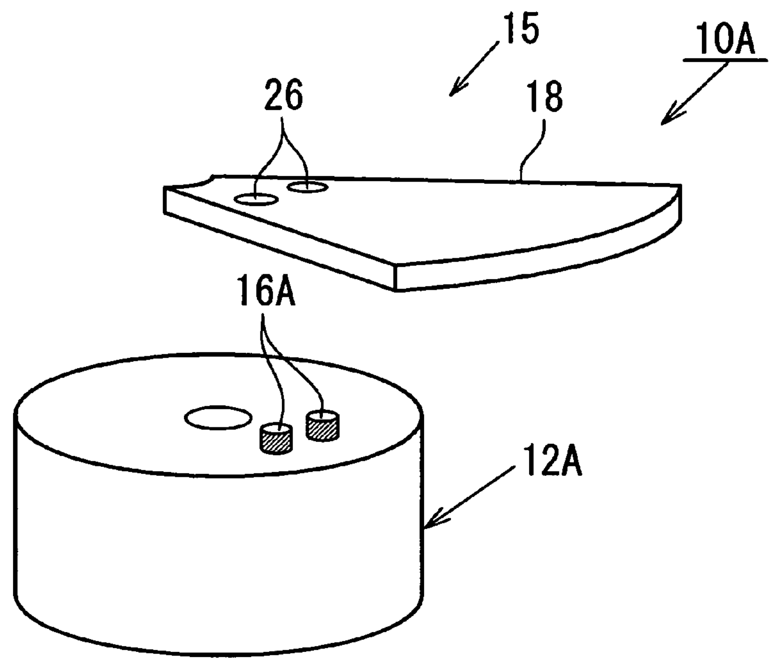
FIG. 2 is an exploded perspective view (partly omitted) of a color wheel assembly according to a second embodiment of the present invention.

Referring now to FIG. 2, a color wheel assembly 10A according to a second embodiment of the present invention comprises a motor hub 12A constituting a driving motor, and a segment-type color wheel 15 including a plurality of color filter segments (only one color filter segment 18 is shown in the figure for the convenience of explanation) and attached directly to the motor hub 12A. The motor hub 12A has a plurality of protrusions 16A (only two are shown in the figure for the convenience of explanation), each of the color filter segments (hereinafter referred to simply as segments as appropriate) 18 et al. has through-holes or cavities (through-holes in the figure) 26 for receiving the protrusions 16A, and the segments 18 et al. constituting the color wheel 15 are adhesively attached to the motor hub 12A such that the protrusions 16A are fitted into the through-holes 26, where the protrusions 16 may be press-fitted into the through-holes 26, or loose-fitted therein to be adhesively fixed. In this connection, though not shown, the motor hub 12A may be formed by casting, molding, or pressing so as to integrally include the protrusions 16A.

Figure 3:
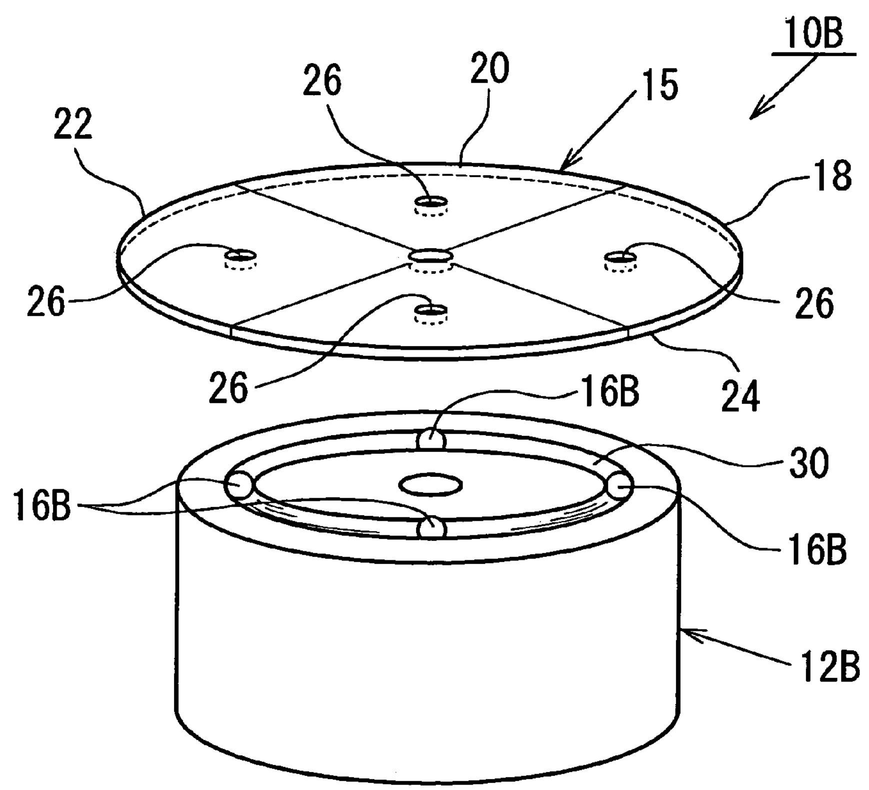
FIG. 3 is an exploded perspective view of a color wheel assembly according to a third embodiment of the present invention.
Figure 4A:
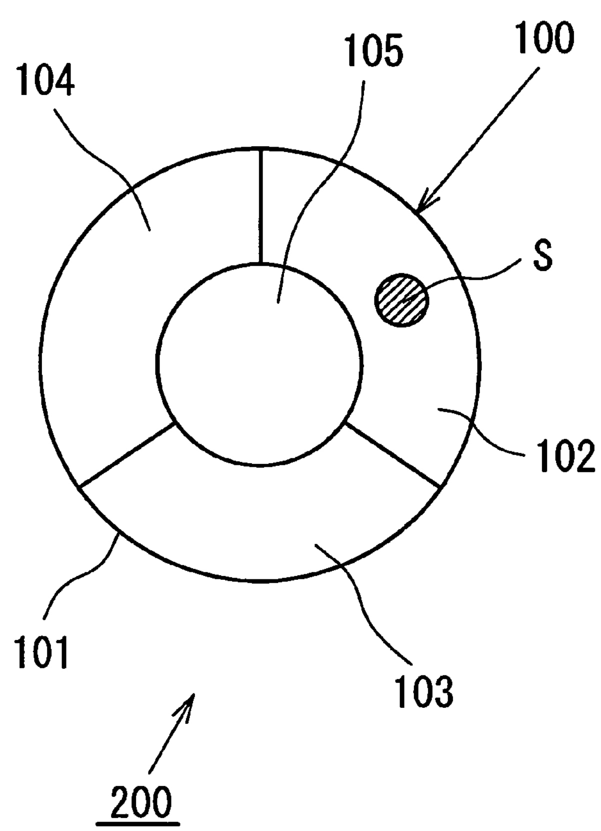
FIGS. 4A and 4B are respectively top plan and side views of a conventional color wheel assembly.
Figure 4B:
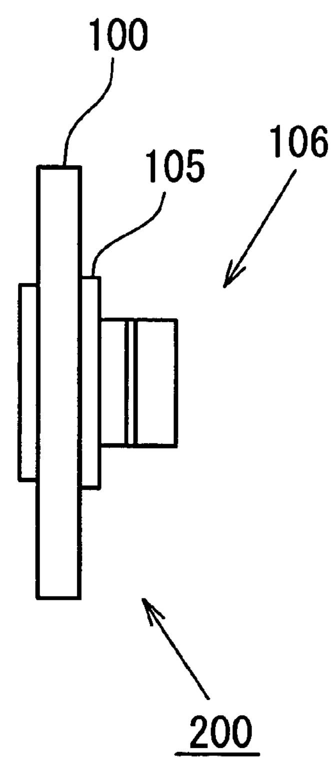
Figure 5:
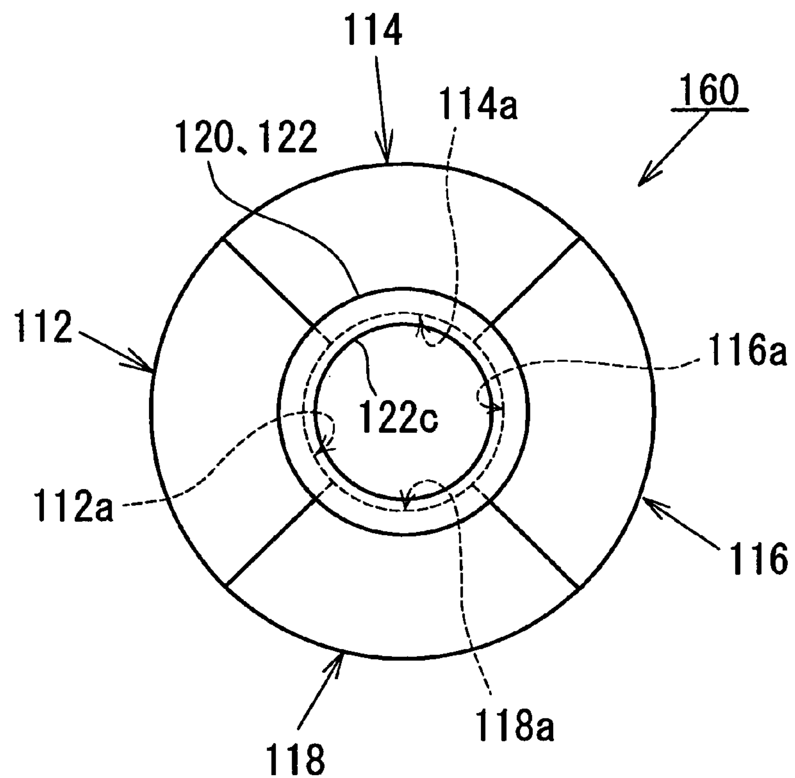
FIG. 5 is a plan view of a conventional segment-type color wheel.
Figure 6:
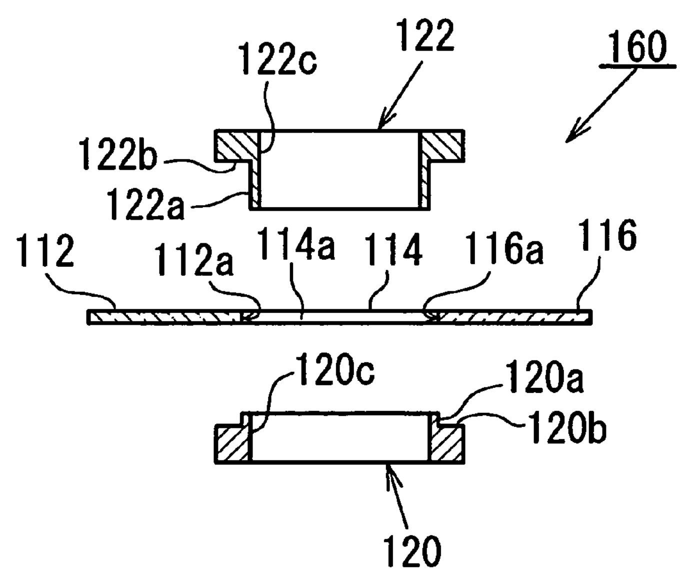
FIG. 6 is an exploded sectional view of the color wheel of FIG. 5.

Two through-holes 26 are formed at the segment in FIG. 2, but alternately one through-hole 26 (as shown in FIG. 3), or three or more through-holes 26 may be formed at each of the segments including the segment 18, and the protrusions 16A are provided at the motor hub 12A in a number corresponding to the total number of the through-holes 26 formed on the segments 18 et al. Also, the protrusion 16A, which is constituted by a simple cylinder in FIG. 2, may alternatively be constituted by, for example, a cylinder or pin with a rounded top end, a semispherical object, or spherical object such as a bearing ball. The protrusions 16A may be press-fitted into holes formed at the motor hub 12A, or may be loose-fitted therein to be adhesively fixed. The segments 18 et al. are typically formed of glass, and the through-holes (or cavities) 26 may be formed by normal machining, ultrasonic machining, blasting, laser machining, or the like.

The segments 18 et al. may alternatively be fixed to the motor hub 12A in the following manner: the segments 18 et al. are placed on the motor hub 12A with the holes but without the protrusions 16A such that the through-holes (not cavities in this case) 26 coincide with respective holes formed at the motor hub 12A; and then cylinders, pins, or cylindrical or spherical objects constituting the protrusions 16A are press-fitted into both the through-holes 26 of the segments 18 et al. and the holes of the motor hub 12A, or loose-fitted therein to be adhesively fixed.

In any manner of fixing the segments 18 et al. to the motor hub 12A, the protrusions 16A on the motor hub 12A are engaged with the through-holes (or cavities) 26 of the segments 18 et al., whereby the segments 18 et al. are duly positioned with respect to the motor hub 12A in the radial direction of the color wheel 15 when the color wheel assembly 10A is completed.

FIG. 3 shows a third embodiment of the present invention, where the protrusions 16A of the second embodiment are constituted by spherical objects, specifically balls 16B. In the third embodiment, a color wheel assembly 10B comprises a motor hub 12B constituting a motor, and a segment-type color wheel 15 including a plurality (four in the figure) of color filter segments 18, 20, 22 and 24. Each of the segments 18, 20, 22 and 24 has at least one (one in the figure) hole or cavity for accepting each of the balls 16B functioning as the protrusions 16A of the first embodiment, and the motor hub 12B has an annular groove 30 formed on a surface thereof facing the color wheel 15. The annular groove 30 is positioned concentric with the rotation axis of the motor, and adapted to freely receive the balls 16B. The annular groove 30 may be interrupted at a regular interval into several arc grooves.

In the embodiments described above, the color wheel 14/15 may be attached to a motor such that the color wheel 14/15 is fixed to the motor hub 12/12A/12B preassembled to the rest of the motor components, or such that the color wheel 14/15 is fixed to the motor hub 12/12A/12B yet to be assembled to the rest of the components, and then the motor hub 12/12A/12B with the color wheel 14/15 fixed thereto is assembled to the rest of the motor components.

According to the above-described embodiments of the present invention, the following advantages are achieved.

Since the color wheel 14/15 is attached directly to the motor hub 12/12A/12B of the motor without using any additional components such as a support member or a clamp member, the structure and the manufacturing process for fixing the color wheel 14/15 to the motor can be simplified. The resultant reduction in the number of components lessens the number of factors to adversely influence the rotational balance, whereby the balance adjusting work can be eased and the balance-related problems can be reduced. Thus, the color wheel assembly 10/10A/10B as a time-share light dispersing device can be manufactured superiorly with a high degree of precision and inexpensively with a reduced number of components and a reduced number of assembling processes.

The present invention can be applied to a color wheel assembly (such as the color wheel assembly 10A/10B) incorporating a segment-type color wheel (such as the color wheel 15) as well as a color wheel assembly incorporating a monolithic-type color wheel, and achieves the same advantage described above.

In case of the color wheel assembly 10A according to the second embodiment, the protrusions 16A constituted by pins or balls press-fitted into the through-holes or cavities formed at the motor hub 12A or loose-fitted therein to be adhesively fixed are engaged with the through-holes or cavities 26 formed at the segments 18 et al., whereby the segments 18 et al. can be duly and fixedly positioned with respect to the motor hub 12A in the radial direction of the color wheel 15. Consequently, the segments 18 et al. can be surely prevented from getting scattered off from the motor hub 12A due to centrifugal force when the color wheel 15 spins at high speed. The engagement may be implemented such that the protrusions 16A are press-fitted through the through-holes 26 of the segments 18 et al. and the through-holes or cavities of the motor hub 12A or loose-fitted therethrough to be adhesively fixed after the color wheel 15 consisting of the segments 18 et al. is placed on the motor hub 12A such that the through-holes 26 of the segments 18 et al. coincide with the through-holes or cavities of the motor hub 12A. In this connection, the motor hub 12A may be formed by casting, molding, or pressing so as to integrally include the protrusions 16A, in which case the numbers of components and manufacturing processes can be further reduced.

Also, in case of the color wheel assembly 10B according to the third embodiment, the balls 16B as an equivalent of the protrusions 16A in the second embodiment are disposed so as to move freely along the annular groove or arc grooves 30 of the motor hub 12B. Consequently, the color wheel 15 can turn with respect to the motor hub 12B after they are attached to each other, so adhesive applied therebetween can be preferably spread for enhanced bonding strength.

Further, if the motor hub 12/12A/12B is assembled to the rest of the motor components after the color wheel 14/15 is attached to the motor hub 12/12A/12B, forces that are applied to the motor hub 12/12A/12B when the color wheel 14/15 is attached to the hub 12/12A/12B are not applied to bearings which hold rotatably the hub 12/12A/12B with respect to the other portion of the motor, whereby problems related to defective bearings can be suppressed.

Obviously, many modifications and variations of the present invention are possible in light of the above teachings. Thus, it is to be understood that, within the scope of the appended claims, the invention may be practiced otherwise than as specifically described above.

What is claimed is:

1. A color wheel assembly comprising:

a driving motor including a hub; and a color wheel including a plurality of filters that either selectively transmit or selectively reflect lights having respective wavelengths different from one another, the color wheel being attached directly to the hub of the driving motor, wherein the color wheel comprises a plurality of independent sectorial color filter segments arranged on an outer surface of the hub of the driving motor, the independent sectorial color filter segments being independently arranged so as to form a disk.

2. A color wheel assembly according to claim 1, wherein the hub has protrusions, and the sectorial color filter segments each have either at least one through-hole or at least one cavity for receiving each of the protrusions.

3. A color wheel assembly according to claim 2, wherein the protrusions are each constituted by a pin which is press-fitted into each of either through-holes or cavities formed at the hub.

4. A color wheel assembly according to claim 2, wherein the protrusions are each constituted by a pin which is loose-fitted in each of either through-holes or cavities formed at the hub and is adhesively fixed therein.

5. A color wheel assembly according to claim 2, wherein the protrusions are each constituted by a ball which is press-fitted into each of either through-holes or cavities formed at the hub.

6. A color wheel assembly according to claim 2, wherein the protrusions are each constituted by a ball which is loose-fitted in each of a through-hole or a cavity formed on the outer surface of the hub and is adhesively fixed therein.

7. A color wheel assembly according to claim 2, wherein the protrusions are engagingly inserted through the through-holes of the sectorial color filter segments, and through either the through-holes or the cavities of the hub when the color wheel is placed on the hub such that the through-holes of the sectorial color filter segments coincide with either the through-holes or the cavities of the hub.

8. A color wheel assembly according to claim 2, wherein the hub is formed by one of casting and molding so as to integrally include the protrusions.

9. A color wheel assembly according to claim 2, wherein the hub is formed by pressing so as to integrally include the protrusions.

10. A color wheel assembly according to claim 6, wherein the cavity is an annular groove, the annular groove being concentric with an axis of rotation of a shaft of the motor.

11. A color wheel assembly according to claim 6, wherein the cavities formed on the outer surface of the hub are arc-shaped grooves being arranged so as to form a discontinuous annular groove that is concentric with an axis of rotation of a shaft of the motor.

12. A color wheel assembly according to claim 2, wherein the protrusions are press-fitted into either the through-holes or the cavities of the sectorial color filter segments.

13. A color wheel assembly according to claim 2, wherein the protrusions are loose-fitted in either the through-holes or the cavities of the sectorial color filter segments and are adhesively fixed therein.

* * * * *